United States Patent [19]

Gurley et al.

[11] Patent Number: 5,317,400
[45] Date of Patent: May 31, 1994

[54] NON-LINEAR CUSTOMER CONTRAST CONTROL FOR A COLOR TELEVISION WITH AUTOPIX

[75] Inventors: Thomas D. Gurley; William A. Lagoni, both of Indianapolis, Ind.

[73] Assignee: Thomson Consumer Electronics, Inc., Indianapolis, Ind.

[21] Appl. No.: 887,737

[22] Filed: May 22, 1992

[51] Int. Cl.$^5$ .......................................... H04N 5/57
[52] U.S. Cl. ................................. 348/679; 348/645
[58] Field of Search ............... 358/169, 168, 160, 171, 358/172, 27, 183; H04N 5/57, 9/64

[56] References Cited

U.S. PATENT DOCUMENTS

| | | | |
|---|---|---|---|
| 5,003,394 | 3/1991 | Lagoni | 358/168 |
| 5,040,065 | 8/1991 | Vilard | 358/169 |
| 5,134,490 | 7/1992 | Neal | 358/169 |

FOREIGN PATENT DOCUMENTS

| | | | |
|---|---|---|---|
| 414183A2 | 2/1991 | European Pat. Off. | H04N 9/64 |
| 4008214 | 9/1991 | Fed. Rep. of Germany | G05B 1/03 |
| 57-79731 | 5/1982 | Japan | H04N 5/57 |
| 2-178049 | 7/1990 | Japan . | |

OTHER PUBLICATIONS

1968 Electronics Catalog by "Allied Radio", Catalog #270 p. 292.

*Primary Examiner*—James J. Groody
*Assistant Examiner*—David E. Harvey
*Attorney, Agent, or Firm*—Joseph S. Tripoli; Peter M. Emanuel

[57] ABSTRACT

In a TV system which includes an autopix feedback loop limiting the range over which the contrast can be controlled, there is included means for generating a non-linear contrast control voltage as a function of customer control settings in order to extend the range over which the customer can control the contrast.

14 Claims, 6 Drawing Sheets

NON-LINEAR CUSTOMER CONTRAST CONTROL FOR A COLOR TELEVISION WITH AUTOPIX

FIELD OF THE INVENTION

This invention relates to an arrangement for controlling the contrast of a television receiver or monitor and, in particular, to circuitry for extending the range of customer contrast control of a television receiver, or monitor, having automatic contrast control capability.

BACKGROUND OF THE INVENTION

In modern television systems it is known to automatically control the contrast and brightness of a reproduced image. For example, a TV system with automatic contrast control to inhibit "white spot blooming" is described in U.S. Pat. No. 5,003,394 entitled DYNAMIC VIDEO SYSTEM INCLUDING AUTOMATIC CONTRAST AND "WHITE STRETCH" PROCESSING SECTIONS issued to William A. Lagoni and assigned to the assignee of this application. Other TV systems which include automatic contrast control are described in the following patents pending applications: (a) U.S. Pat. No. 5,204,748 titled BEAM CURRENT LIMITING ARRANGEMENT FOR TELEVISION SYSTEM WITH PICTURE-IN-PICTURE PROVISIONS filed for William A. Lagoni; (b) Ser. No. 751,810 titled VIDEO SYSTEM INCLUDING APPARATUS FOR DEACTIVATING AN AUTOMATIC CONTROL ARRANGEMENT filed for W. A. Lagoni and R. L. O'Brien; and (c) U.S. Pat. No. 5,245,434 titled AUTOPIX CIRCUIT WITH INSERTED VERTICAL BLANKING filed for Thomas D. Gurley. The above identified applications are assigned to the assignee of this application, and their teachings as well as those of the above identified patent are incorporated herein by reference.

Automatic contrast control (which is also referred to as "autopix" where "pix" is an abbreviation for "picture") prevents loss of detail sharpness in highlight (white) areas due to blooming, while permitting high contrast (and therefore subjectively bright) images when the signal peaks remain below the blooming threshold.

Figure 1:
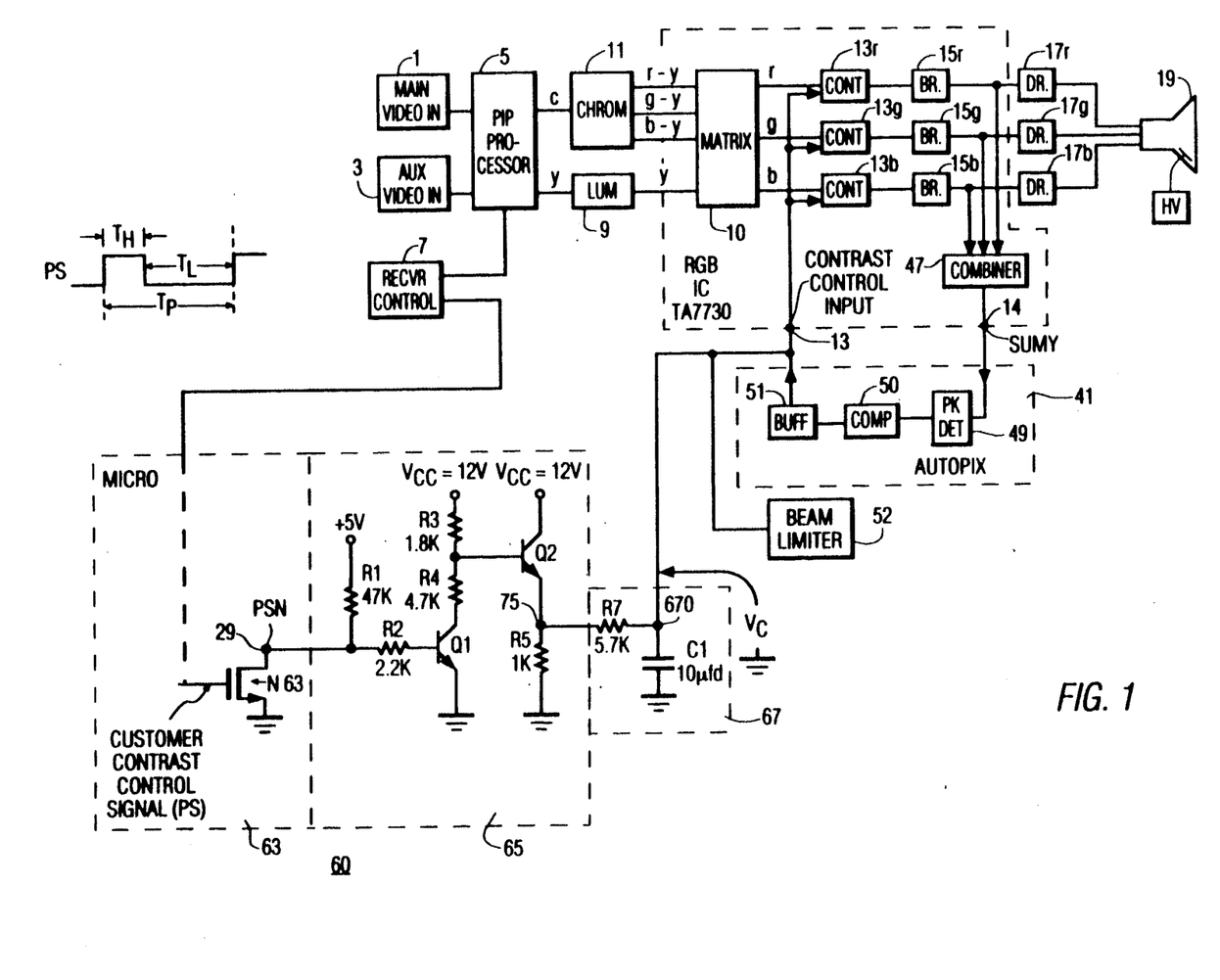
FIG. 1 is a semi-schematic semi-block diagram of a known TV system.

Automatic contrast control circuitry used in modern TV systems is shown in FIG. 1. [For ease of illustration, only those portions of a TV system deemed pertinent to a discussion of the invention are shown in FIG. 1. A more detailed description of the TV systems is presented in the references cited above.]

Referring to FIG. 1, there is shown main and auxiliary video inputs 1 and 3, respectively, coupled to a picture-in-picture (PIP) processor 5 which is also controlled by a receiver control 7. PIP processor 5 provides signals (C and Y) to luminance circuit 9 and to chrominance circuit 11. The outputs of luminance and chrominance circuits 9 and 11, respectively, are applied to a matrix 10 whose outputs are red(r), blue(b), and green(g) color signals which are applied to respective inputs of a contrast control section 13r, 13b, and 13g. The contrast control section (e.g., 13r, 13b and 13g) is responsive to the red (r), blue (b) and green (g) color signals and its outputs are applied to a brightness control section (e.g. 15r, 15b and 15g) whose outputs are coupled via drivers (e.g. 17r, 17b and 17g) to a picture tube (e.g. 19).

The automatic contrast control arrangement includes a combiner circuit 47 for deriving a "combined" signal (e.g., SUMY) from the ouputs of the brightness section. The combined signal (i.e., SUMY) as used herein and in the claims appended hereto is representative of the luminance component of the displayed image. The combined signal (SUMY) is then processed via an autopix circuit 41 comprised of a peak detector 49 and a comparator 50 whose output is fed back via a buffer 51 to the control input terminal 13 of the contrast control section (13r, 13b, 13g) of the TV system. The autopix loop 41 comprising peak detector 49, comparator 50, and buffer 51 defines a feedback loop coupled between the output (terminal 14) of the combiner circuit 47 and the input control (terminal 13) of the contrast control section which determines the closed loop gain of the contrast control section. The open loop gain of the contrast control section (13r, 13g, 13b) is determined, in part, by a customer contrast control unit 60 which is driven by receiver control 7.

Contrast control unit 60 includes a common control microprocessor 63, a buffer amplifier 65 and a low pass filter 67. The microprocessor 63 is used to control various functions such as peaking, contrast and brightness. Under the control of microprocessor 63 and a switching element represented by N63, a pulse signal (PS) and its logical complement PSN are generated. The pulse signals PS and PSN include pulses which are pulse width modulated (PWM) to represent the customer's contrast control settings, also defined and referred to herein as customer control steps. The signal PSN (which is the logical complement of PS) is produced at node 29 of microprocessor 63 and is applied to the input of the buffer amplifier 65.

Amplifier 65 is responsive to the pulse width modulated pulse signal (PSN) and produces at its output node 75 amplified and buffered pulse width modulated output pulses (in phase with the PS signal) which are then applied to the input of a low pass filter 67. Filter 67 represented by a series-connected resistor R7 and a shunt-connected capacitor C1, filters the pulse width modulated signals produced by amplifier 65 to produce a DC user contrast control voltage (Vc) at node 670 which is applied to terminal 13.

In the arrangement shown in FIG. 1, an automatic beam current limiter 52 is also coupled to terminal 13. Consequently, capacitor C1 of low pass filter 67 is shared by circuits 60, 52 and 41 to filter and store the respective control voltages generated by user contrast control unit 60, automatic beam current limiter 52 and automatic contrast control unit 41. The control voltage (Vc) developed across capacitor C1 is thus a combination of the individual control voltages generated by control units 60, 52 and 41.

For the embodiment shown, it is assumed that increasing the direct current (DC) contrast control voltage (Vc) corresponds to increasing gain, and therefore increasing contrast, and that decreasing the DC contrast control voltage (Vc) corresponds to decreasing gain and contrast. [This corresponds to the further assumption that white-going portions of the processed luminance output signal (SUMY) are positive going.]

As shown in FIG. 1, automatic contrast control unit (autopix) 41 includes a peak detector 49 which detects the peaks of the white-going portion of the processed luminance output signal SUMY. The output voltage of white peak detector 49 is coupled to comparator 50. Peak detector 49 and comparator 50 are arranged to decrease the contrast control voltage as a function of the peak amplitude of the luminance output signal when the peak exceeds a predetermined reference voltage.

A problem with the TV system of FIG. 1 is that, for some signals, the autopix feedback loop limits the range over which the contrast control may vary. A drawback of this limitation is that since autopix is a relatively new feature, a customer/user trying to adjust the contrast may believe the TV set is defective because the contrast can not be made to vary in the accustomed manner.

Figure 2:
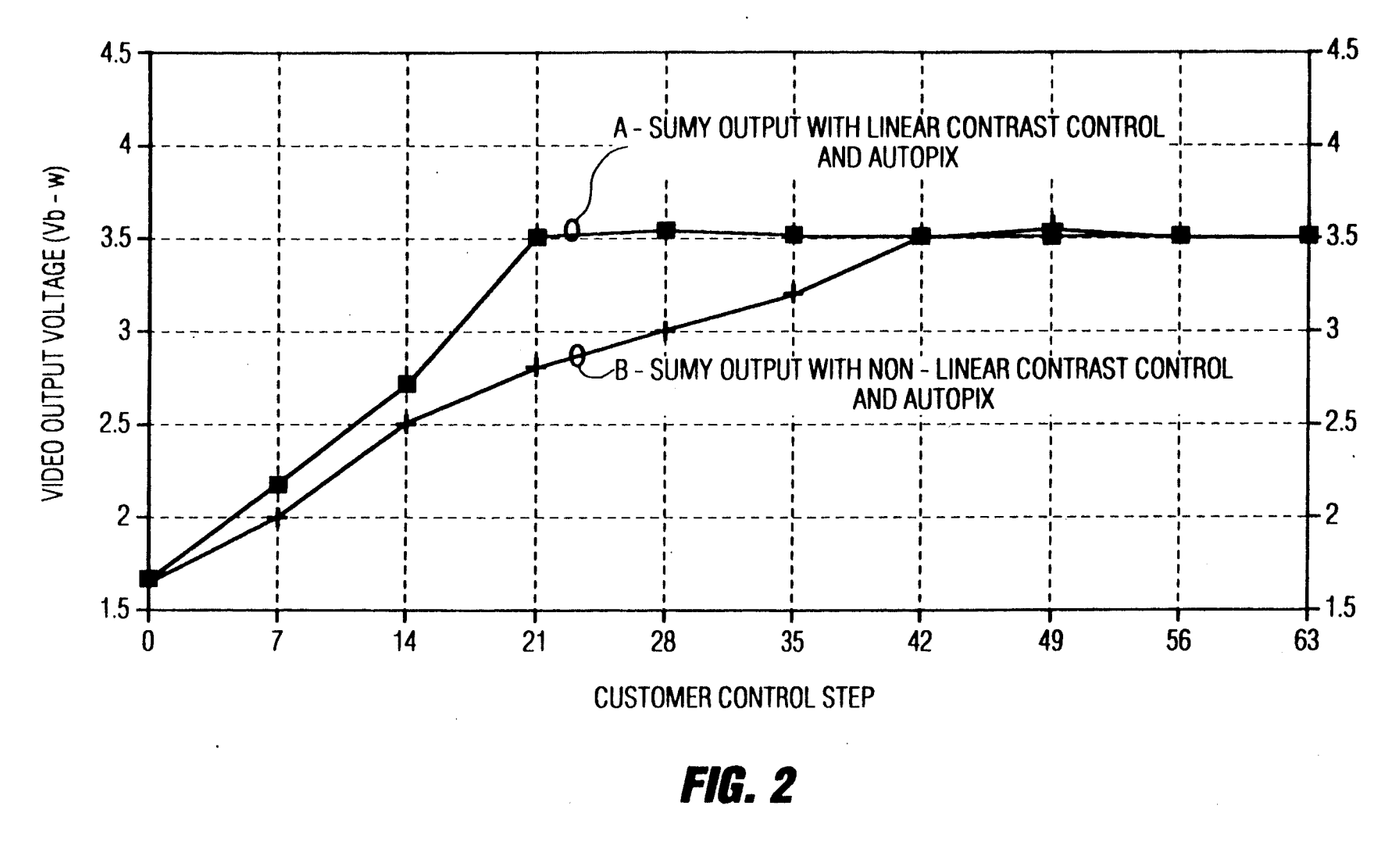
FIG. 2 is a drawing of the Video Output Voltage (SUMY) as a function of customer control steps for a closed loop linear (uncompensated) and non-linear (compensated) conditions.

The extent of the limitation may be better appreciated by reference to curve A of FIG. 2, which shows the SUMY output at terminal 14. In FIG. 2, the ordinate (y axis) represents the amplitude (in volts) of the video output voltage (SUMY) produced at terminal 14 of FIG. 1, and the abscissa (x axis) represents the 63 control steps (or settings) available to the customer/user to increase (going from step zero to step 63) the contrast. Curve A shows the VIDEO or SUMY output for the condition when the autopix loop 41 is closed; i.e., there is feedback via the feedback loop 41 from terminal 14 to contrast terminal 13.

It is seen that the VIDEO output varies linearly in response to the customer's control steps in the range from zero to 21. However, for customer control steps above 21, the response is flat. That is, the operation of the autopix feedback loop limits the user's ability to alter the contrast above control step 21 with the video output voltage being held at approximately 3.5 volts. Thus, in a system which theoretically provides for 63 control steps, only the first 21 may be effectively used.

SUMMARY OF THE INVENTION

Applicants' invention resides, in part, in the recognition of the problem discussed above and, in part, in the circuitry to extend the range over which the customer can exercise contrast control.

In TV systems embodying the invention, user responsive contrast control voltage generating circuitry is intentionally rendered non-linear to produce a non-linear control voltage which is applied to the contrast control section in a manner to extend the range over which the user can control the contrast of the TV receiver.

In a partcular embodiment, the TV system includes a contrast control section and a brightness control section with each one of the contrast and brightness control sections having inputs and outputs and with the outputs of the contrast control section being coupled to the inputs of the brightness control section. Color signals are applied to the inputs of the contrast control section for processing the color signals via the contrast and brightness control sections. The outputs of the brightness control section are combined for producing a combined signal. A feedback loop (autopix) responsive to the combined signal is coupled between the outputs of the brightness control section and the inputs of the contrast control section. The feedback loop functions to limit the range over which the contrast can vary. User responsive contrast control voltage circuitry is coupled to the input of the contrast control section and applies to it a contrast control voltage which is a non-linear function of the customer control signals for extending the range over which the user can vary the contrast.

BRIEF DESCRIPTION OF THE DRAWING

In the accompanying drawing like reference characteristics denote like components.

DETAILED DESCRIPTION OF THE INVENTION

Figure 3:
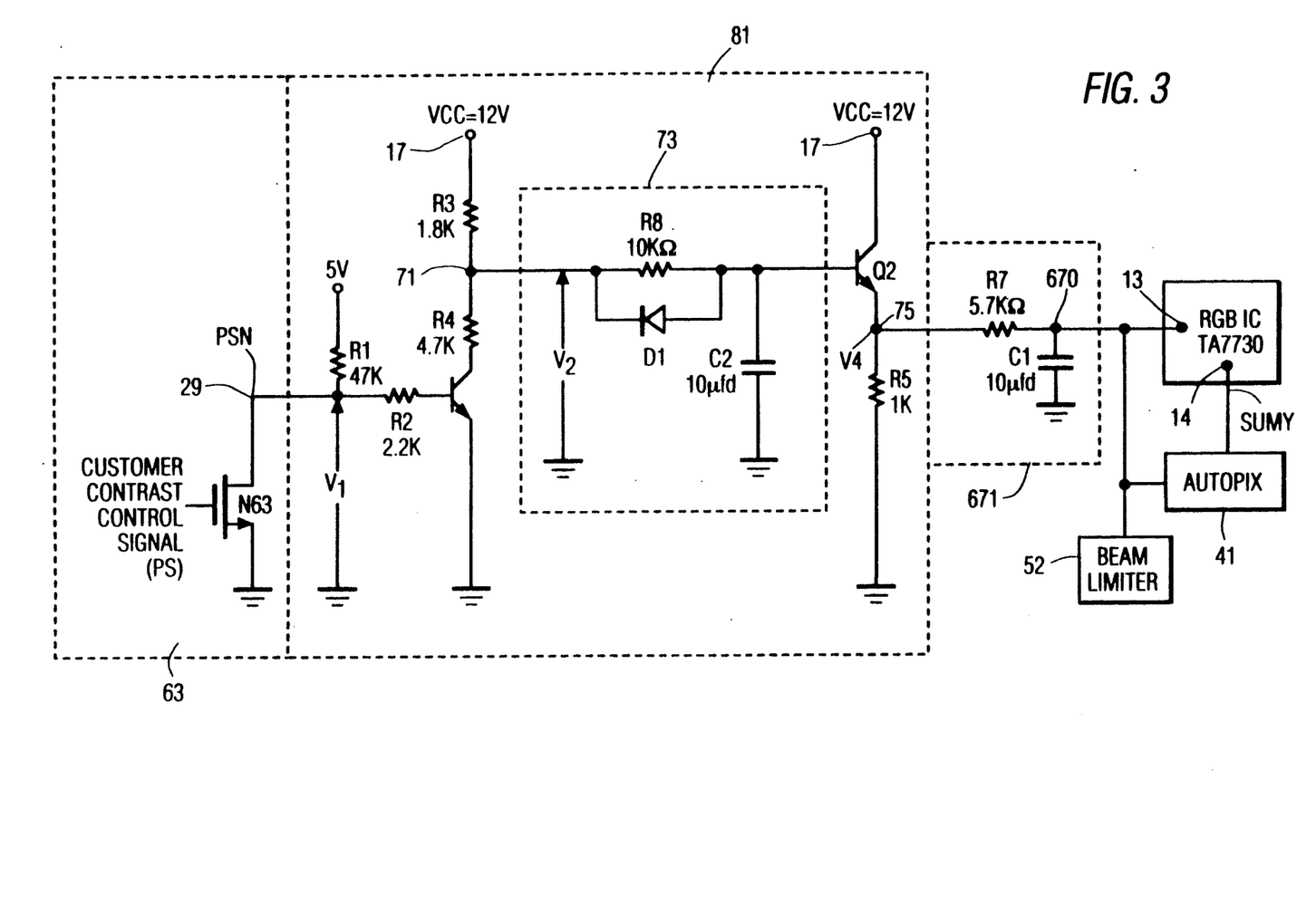
FIG. 3 is a schematic diagram of a contrast control circuit embodying the invention for use with the circuit of FIG. 1.

FIG. 3 shows a user contrast control voltage generating circuit embodying the invention and, in particular, to an amplifier/filter 81 which may be substituted for the buffer amplifier 65 of FIG. 1.

Referring to FIG. 3, there is shown the application of a pulse width modulated customer contrast control pulse signal (PS) to the gate of a switch N63 for controlling its turn-on and turn-off and the logical complement signal (PSN) generated at output terminal 29 of microprocessor 63 which is connected via a pull-up resistor R1 to a source of +5 volts. PSN is applied via resistor R2 to the base of an NPN bipolar transistor Q1 whose emitter is grounded. A resistor R4 is connected between the collector of Q1 and a node 71 and a resistor R3 is connected between node 71 and a power terminal 17 to which is applied Vcc volts which may be, for example, a positive 12 volts.

A nonlinear low pass filter 73 is connected between node 71 and the base of an NPN bipolar transistor Q2 operated as a emitter follower. The filter 73 includes a resister R8 connected between node 71 and the base of Q2, a diode D1 having its cathode connected to node 71 and its anode connected to the base of Q2, and a capacitor C2 connected between the base of Q2 and ground.

The collector of Q2 is connected to terminal 17 and its emitter is connected to an output node 75. A ground return emitter resistor R5 is connected between node 75 and ground. A low pass filter 671 which may be of the same type as filter 67 of FIG. 1 is connected between node 75 and contrast control terminal 13 of the RGB IC. As in FIG. 1, a resistor R7 is connected between node 75 and contrast control terminal 13 and a filter capacitor C1 is connected between terminal 13 and ground. As in FIG. 1, an output of the autopix network 41 and an output of the beam limiter circuit 52 are connected back to terminal 13.

The operation of the circuit of FIG. 3 and, in particular, the role of the nonlinear network 73 will now be discussed.

Referring to network 73, the combination of R8, D1 and C2 functions to produce a non-linear direct current (DC) contrast control voltage (Vc). In the circuit of FIG. 3, capacitor C2 is isolated from C1 (and terminal 13), whereby C2 can be charged and/or discharged at different rates. When Q1 is fully turned-off, C2 is charged by the series combination of R3 and R8. When Q1 is turned-on, C2 discharges via D1 (poled to conduct in the forward direction) which shunts R8, and the parallel combination of R3 and R4. Therefore, the charging time constant (Tc) is approximately (R3+R8)(C2) while the discharge time constant (Td) is approximately (R3 in parallel with R4) multiplied by (C2). For R3=1.8K ohms, R8=10K ohms, and R4=4.7K ohms, the series resistance of R3+R8 is approximately 12K ohms and the parallel combination of R3 and R4 is approximately 1.3K ohms. Consequently, it is evident that the charging time constant (Tc) is more than nine (9) times greater than the discharge time constant (Td). The unequal charge and discharge times of network 73 in FIG. 3 produces the various curves shown in curves B of FIGS. 2, 4 and 5.

Figure 3A:
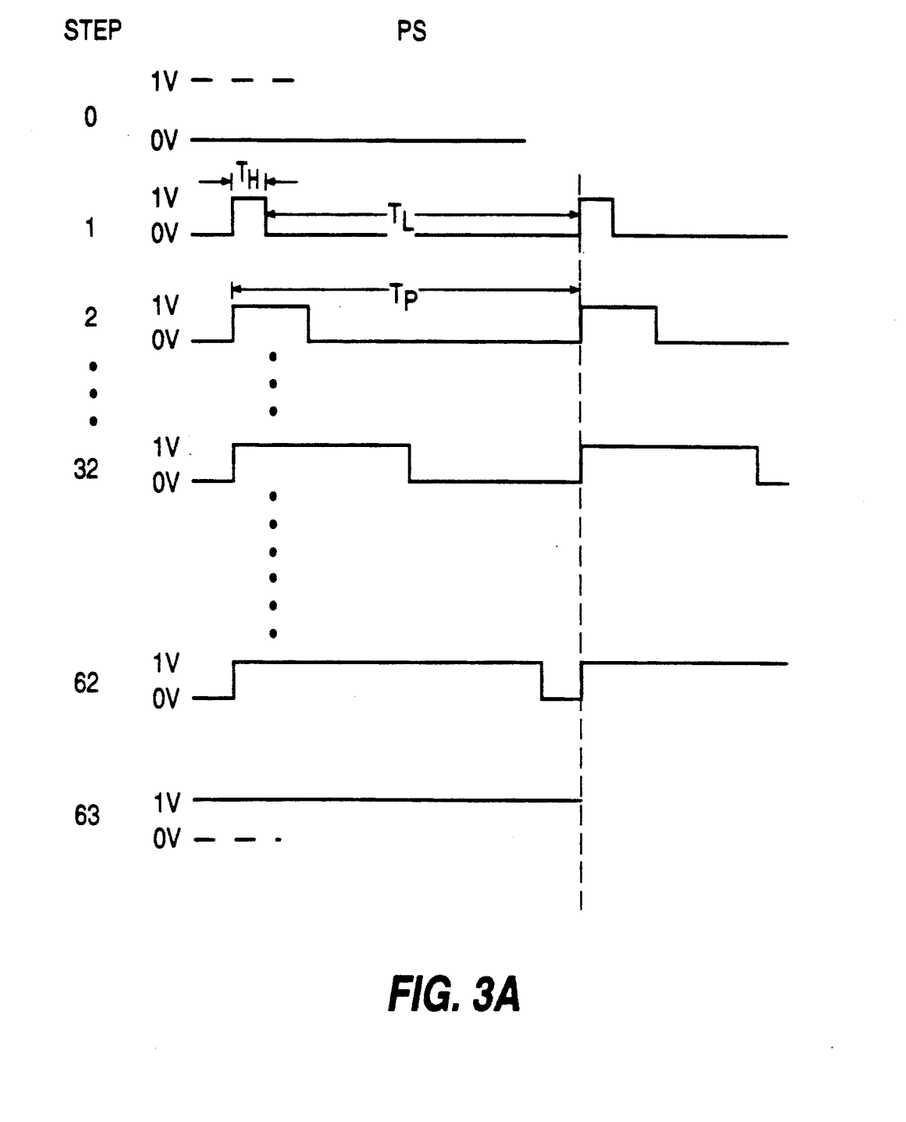
FIG. 3A is a drawing of a typical pulse width modulated pulse signal corresponding to several customer control steps.

To better understand the role played by filter 73, note that in the circuit of FIG. 3 (as in FIG. 1) the user can vary (increase or decrease) the contrast in 63 steps. The user's control is manifested by the production of a pulse width modulated pulse signal (PS) of the type shown in FIG. 3A. The PSN signals produced at terminal 29 of the microprocessor are the logical complement of the PS signals and are applied to the input of the buffer amplifier 81. As shown in FIG. 3A, the period (Tp) of the pulse signal may be divided into 64 steps (63 increments). The first step is a zero dc voltage level to ensure the full turn-off of N63 and the 64th step is a direct current (dc) level of sufficient amplitude to ensure that N63 is fully turned-on. The pulse period Tp is divided into 63 equal increments with each succeeding higher step having a pulse width which is greater than the lower previous step by Tp/63. Thus, the "high" level pulse width (TH) duration of any step (Ni) between step 1 and step 63, may be expressed as (Ni/63)(Tp); where Tp is the pulse width duration which is equal to TH plus TL where TH is the length of time the pulse is high and TL is the length of time the pulse is low. Varying the length of time a pulse is high (e.g., TH) versus the pulse duration (Tp) is a means of varying the duty cycle [i.e., (TH/Tp)(100%)] of the pulse train applied to the amplifier/filter combination. As further detailed below, the direct current (d.c.) level of the contrast control voltage is varied by varying the duty cycle of the pulse train.

For ease of explanation, we shall first examine the response of the circuit of FIG. 3 for two end point conditions. In the discussion to follow, it is assumed that when PS is "low" or "0", PSN is "high" and of sufficient amplitude to fully turn-on Q1 and that when PS is "high" or logic "1", PSN is "low" or "0" and of such an amplitude to fully turn-off Q1.

1. First, at step 0, PS is "low" or "0", PSN is "high" and Q1 is on hard. For this condition, the voltage divider network of R3 and R4 causes the voltage at node 71 to be approximately equal to 8.6 volts. The base of Q2 will be less than, but close to, that voltage and the voltage at the emitter of Q2 (node 75) will be approximately 0.7 volt below the Q2 base voltage. This condition defines the minimum voltage produced at the emitter of Q2 and the minimum voltage (Vc) produced at output node 670 and applied to terminal 13 which is approximately equal to 7.9 volts a shown in FIGS. 4 and 5.

Figure 4:
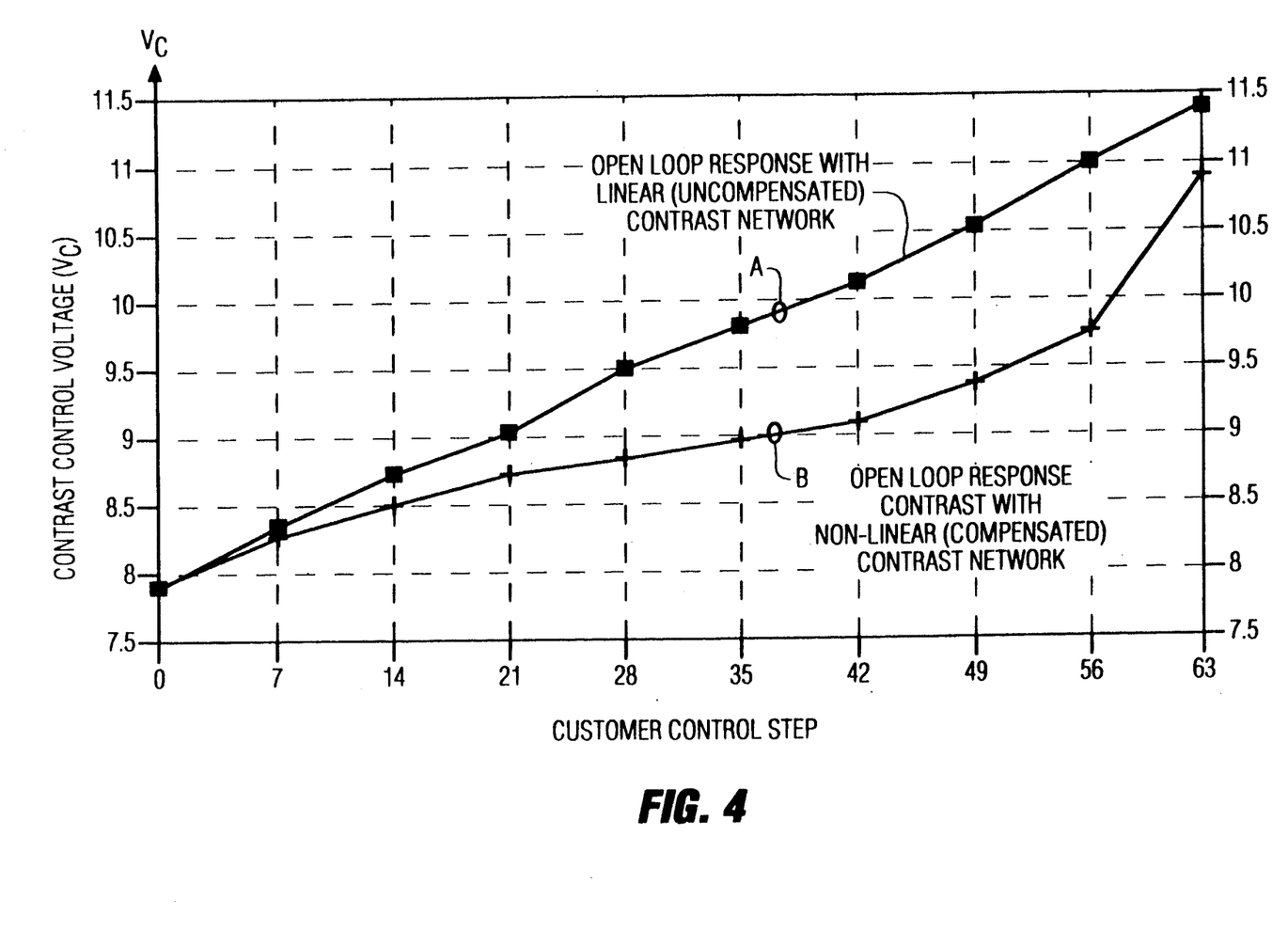
FIG. 4 is a drawing of the contrast control voltage as a function of customer control step for the open loop linear (uncompensated) and non-linear (compensated) conditions.

2. At step 63, PS is at a "high" dc level and PSN is at a "low" level whereby Q1 is fully turned-off. Since Q1 is non-conducting, the base of Q2 is coupled via the series combination of R3 and R8 to Vcc volts. Due to the emitter follower action of Q2, the voltage drop across R3 and R8 will be relatively small, being a function of the base current into Q2. For Vcc equal to 12 volts, the voltage drop across R3 and R8 may be assumed to be approximately 0.4 volt, whereby the voltage at the base of Q2 is approximately 11.6 volts. Assuming a VBE drop of approximately 0.7 volt, the voltage (V4) at the emitter of Q2 is then approximately 10.9 volts as shown in FIG. 4. Thus, the maximum voltage (VMAX or VcMax) produced at the emitter of Q2 and hence at node 670 and applied to terminal 13, is approximately 10.9 volts, while the minimum voltage (VMIN or VcMIN) is approximately 7.9 volts. Consequently, the customer control steps may be used to vary the dc contrast control voltage (Vc) between a minimum value (e.g. 7.9 volts) and a maximum value (e.g. 10.9 volts). As noted above, for the embodiment shown, it is assumed that increasing the direct current (DC) contrast control voltage (Vc) corresponds to increasing gain, and therefore increasing contrast, and that decreasing the DC contrast control voltage (Vc) corresponds to decreasing gain and contrast. Also, in contrast to the known circuit of FIG. 1, in circuits embodying the invention, the dc contrast control (Vc) is not increased (decreased) linearly as a function of increasing (decreasing) steps (settings).

To better appreciate the effect of the non-linear compensation provided by the invention, reference is made to the circuits of FIGS. 1 and 3 and to the curves shown in FIG. 4. Referring back to the circuit of FIG. 1, the amplifier 65 functions to charge capacitor C1 with a charging time constant (Tc) which is nearly equal to the discharging time constant (Td). As a result, in the circuit of FIG. 1, the pulse signal causes the contrast control voltage produced at the emitter of Q2 and across capacitor C1 to increase linearly as the control settings are increased from 0 to 63. The result of the open loop operation of the circuit of FIG. 1 is shown in curve A of FIG. 4.

Note that in the circuit of FIG. 1, for the open loop condition (when the output of autopix 41 is not connected to node 13) the contrast control voltage, Vc, rises linearly from a VcMIN value of approximately 7.9 volts dc for the zero customer control step (setting) to a value of approximately 11.4 volts dc at the 63rd customer control step.

Referring back to FIG. 3, recall that in network 73 the charging time constant (Tc) is made much greater than the discharge time constant (Td). Consequently, the open loop dc voltage produced at the emitter of Q2 (node 75) and at node 67 tends to increase slowly for the low values of customer control steps (settings) where the pulse width of the pulse signal is small and to increase more quickly for the higher valued customer control settings where the pulse width of the pulse signal is larger. This is illustrated by curve B of FIG. 4. Comparing curve B with curve A, it is evident that the compensated (nonlinear) curve B increases more slowly than the non-compensated (linear) curve A as a function of increasing customer control steps (settings). Therefore, by making the charging time constant greater than the discharging time constant (Tc>Td) the contrast control voltage (Vc) produced at the output of the filter 671 and applied to terminal 13 of the contrast control section tends to be less than the value of Vc produced when Tc is approximately equal to Td. The end points of curve A and curve B are different because of the additional voltage drop across R8. However, if Q2 were a much higher gain device, the two end points would be much closer.

The smaller increments of control voltage (Vc) for the lower valued control steps generated by the circuit of FIG. 3 (as compared to the circuit of FIG. 1) effectively reduces the drive and the gain of the contrast control section 13b, 13g, 13r for the lower valued customer control steps. Consequently, when the control voltage Vc of curve B of FIG. 4 is applied to terminal 13 and the feedback loop is closed (i.e, autopix 41 is connected in circuit) the response of the system is as shown in curve B of FIG. 5.

Figure 5:
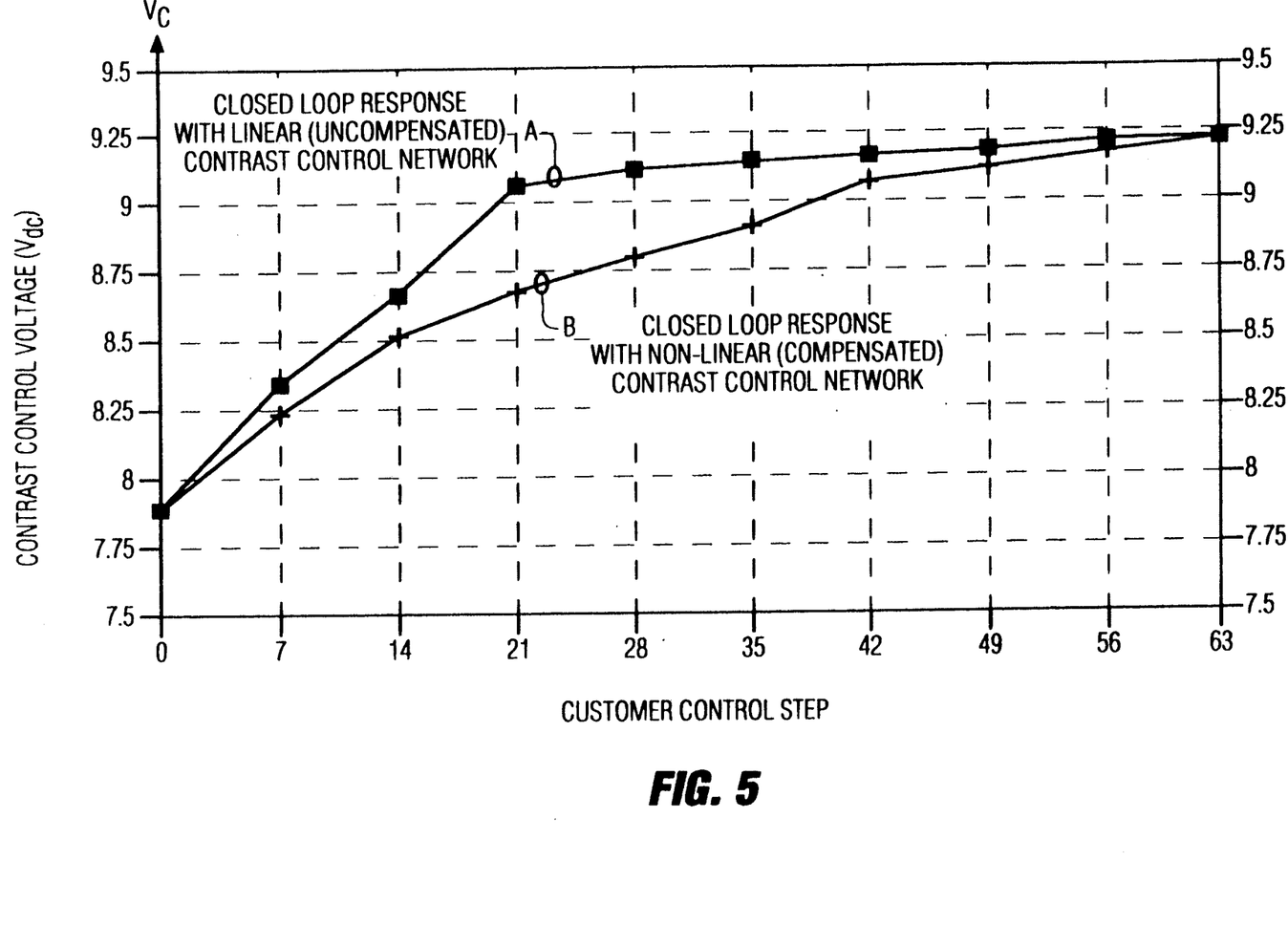
FIG. 5 is a drawing of the contrast control voltage as a function of customer control steps for the closed loop linear (uncompensated) and non-linear (compensated) conditions.

FIG. 5 shows how the open loop voltage Vc of FIG. 4 applied to terminal 13 of the contrast control section varies when the autopix loop 41 is closed and operable. That is, FIG. 5 corresponds to the condition for which node 670 is connected to terminal 13 of the RGB IC and the autopix feedback loop 41 is closed between terminals 14 and 13 of the RGB IC. Curve A of FIG. 5 illustrates the operation when the amplifier/filter circuit 60 of FIG. 1 is connected in circuit. The control voltage increases linearly from step 0 to step 21 and then remains flat over the rest of the customer control settings (steps 21–63). In contrast thereto, curve B of FIG. 5 illustrates the closed loop response of the circuit when the amplifier/filter 81 of FIG. 3 is substituted for amplifier 65 of FIG. 1. With the amplifier/filter of FIG. 3 connected in circuit, the control voltage varies over a range extending from step 0 to step 49. Thus, it is evident from an examination of curve B of FIG. 5 that the contrast control voltage is now responsive to customer control steps over a range which extends from step 0 to at least step 49.

Refer back to FIG. 2 which shows the response of the video output voltage (the SUMY signal at terminal 14), which is indicative of the video output, as a function of the customer control steps (settings). As discussed above, for the known combination of amplifier 65 and filter 67, the customer control is limited to the first 21 steps (settings). In contrast, for the amplifier/filter 81 of the invention in combination with filter 67 producing the responses shown in curve B of FIGS. 4 and 5, customer control exists over a range extending from step 0 to step 42. Thus, non-linearizing the control voltage applied to terminal 13 as a function of customer control steps as shown in curves B of FIGS. 4 and 5, results in the SUMY output response shown in curve B of FIG. 2. Consequently, in circuits and systems embodying the invention, the luminance is made to be controllable over a range of 42 customer control steps, whereby the contrast control has been expanded over a much wider range than that available with the linear contrast control circuit of FIG. 1.

In FIG. 3, the non-linearization of the contrast control voltage (Vc) was achieved by inserting a network 81 comprised of an amplifier and non-linear low pass filter. It should be appreciated that a similar result could be obtained by non-linearizing the pulse width of the pulse signal as a function of customer control steps and applying the "non-linearized" pulse width signals to a linear amplifier filter combination.

In the circuit of FIG. 3, the duty cycle of the pulse train is varied by using pulse width modulation. However, it should be appreciated that the duty cycle of the pulse train may be varied by using a bit rate multiplier scheme or other known arrangement. In all instances, the teaching of the invention is the production of a direct current (d.c.) contrast control voltage (Vc) which is a non-linear function of the duty cycle of the pulse train.

What is claimed is:

1. In a TV system which includes a contrast control section coupled to a brightness control section and wherein the contrast control and brightness control sections are responsive to red (r), green (g) and blue (b) color signal and wherein the TV system also includes means for combining outputs of the brightness control section to produce a "combined signal" representative of the luminance component of the image to be displayed, and wherein the "combined signal" is coupled via a control loop to the contrast control section for controlling its response to the r, g and b color signals, the improvement comprising:

non-linear contrast control means, coupled to the contrast control section, responsive to externally generated user control signals for controlling the gain of the contrast control section, said non-linear contrast control means for producing control signals which are a non-linear function of the user generated control signals.

2. In the TV system of claim 1, wherein said contrast control means includes a low pass filter whose charging time constant is not equal to its discharging time constant.

3. In the TV system of claim 2, wherein the charging time constant is greater than the discharging time constant.

4. In the TV system of claim 2, wherein said non-linear contrast control means includes:

a first amplifying means having an input responsive to said externally generated user control signals and having an output;

a second amplifying means having an input and an output; and wherein said low pass filter whose charging time constant is not equal to its discharging time constant, is connected between the output of said first amplifying means and the input of said second amplifying means.

5. In the TV system of claim 4, wherein said low pass filter includes an RC network.

6. In the TV system of claim 5, wherein said low pass filter includes a resistor and a capacitor (RC) network and a diode connected across at least part of the resistor whereby said diode functions as a relatively low impedance shunt for one polarity of signals.

7. In the TV system of claim 1, wherein said non-linear contrast control means produces a control voltage applied to said contrast control section in response to said externally generated user control signals.

8. The combination as claimed in claim 7, wherein said externally generated control signals includes pulse width modulated rectangular pulses whose duty cycle is defined as TH/TP where TH is the length of time the pulse is relatively positive, TL is the length of time the pulse is relatively negative, and TP is equal to TH plus TL; and wherein the amplitude of said control voltage is a non-linear function of TH/TP.

9. A TV system comprising:

a contrast control section and a brightness control section; each one of said contrast and brightness control sections having inputs and outputs;

means coupling outputs of the contrast control section to inputs of the brightness control section;

means adapted to receive red (r), green (g) and blue (b) color signals including means for applying said r, g and b color signals to inputs of said contrast control section for processing said r, g and b color signals via said contrast and brightness control sections;

combining means coupled to outputs of the brightness control section for combining said outputs of said brightness control section and producing a combined signal;

a feedback loop responsive to said combined signal coupled between said combining means and said contrast control section; and a non-linear contrast control voltage producing means, coupled to said contrast control section, responsive to customer control signals for producing and applying to said contrast control section a contrast control voltage which is a non linear function of the customer control signals.

10. The TV system of claim 9 wherein said non-linear contrast control voltage producing means includes means for producing a minimum contrast control voltage having a first value (V1), and for increasing the contrast control voltage (Vc) from said first value to a second value (V2) in X steps; and wherein the incremental changes in Vc per each step is other than a constant value equal to (V2−V1)/X.

11. A TV system comprising:

first means responsive to customer contrast control settings for producing a pulse train whose duty cycle is indicative of a customer contrast control setting; and amplifying means coupled to said first means, said amplifying means including a non-linear low pass filter whose charging time constant is substantially different than its discharging time constant for, in response to said pulse train, producing a direct current (dc) output voltage whose level is a non-linear function of the duty cycle of said pulse train.

12. The TV system of claim 11, wherein the duty cycle of said pulse train is varied by modulating the pulse width of the pulses in the pulse train, the width of the pulses being indicative of the customer contrast control setting.

13. The TV system of claim 12, wherein said charging time constant is substantially greater than said discharging time constant for, in response to said pulse width modulated pulse signals, producing a direct current (dc) output voltage whose level is a non-linear function of the pulse width of said pulse signals.

14. In a television system, apparatus comprising:

a source of an input video signal;

means for processing said input video signal to produce an output video signal; said processing means including means for controlling the amplitude of said output video signal in response to a control signal;

means responsive to the amplitude of said output video signal for generating a first control signal;

means for generating a second control signal in response to manual adjustments made by a user; said second control signal having a non-linear characteristic as a function of the user's adjustment; and means for coupling said first and second control signal to said amplitude controlling means so as to control the amplitude of said output video signal as a combined function of said first and second control signals.

* * * * *